Patented Jan. 7, 1947

2,414,057

UNITED STATES PATENT OFFICE 2,414,057

HALOSULFURIZED CARDANOL ETHERS

Ferdinand P. Otto, Woodbury, N. J., assignor to Socony-Vacuum Oil Company, Incorporated, a corporation of New York No Drawing. Application July 19, 1945, Serial No. 606,031

6 Claims. (Cl. 260—125)

This invention has to do with new chemical compounds or reaction products which may be generally designated as oily, halo-sulfurized cardanol ethers or as reaction products of cardanol ethers and sulfur halides.

The present invention is predicated upon the discovery that the compounds or reaction products contemplated herein when blended with a viscous mineral oil fraction such as a hydrocarbon lubricating oil, will improve various properties of the oil. For example, the compounds or reaction products contemplated herein will inhibit oxidation of the oil, thereby retarding the formation of sludge and acidic products. They also impart exceptional extreme pressure lubricating characteristics to lubricating oils, and retard changes in viscosity with temperature change during use.

It is to be understood, however, that the present invention is not concerned with mineral oil compositions, such compositions forming the subject matter of my copending application Serial No. 422,518 filed December 11, 1941, of which my application Serial No. 511,702 filed November 25, 1943, is a continuation-in-part and of which, in turn, the present application is a continuation-in-part and to which reference is made for further details in the composition of these compounds or reaction products.

It is also to be understood that the use of the compounds or reaction products contemplated herein is not confined to the improvement of mineral oils. For example, they may be used as cutting oils, rubber accelerators, etc., and as intermediates in the production of other chemical compositions. Numerous other uses and applications of these compounds or reaction products will be readily apparent to those skilled in the art from the description of their composition and a typical method for preparing them, as provided hereinafter.

As aforesaid, the compounds or reaction products contemplated herein are obtained by reaction of cardanol ethers and sulfur halides, at a temperature between about 20° C. and about 100° C. The term "cardanol," as described in U. S. Patent 2,181,119, denotes a phenol having an empirical formula of $C_{20}H_{32}O$, and probable structural formula of $H_{27}C_{14}.C_6H_4.OH$ with one unsaturated bond in the $H_{27}C_{14}$— radical, which is meta to the —OH radical. The ethers of cardanol, or cardanol ethers, contemplated herein are those in which the hydrogen of the —OH radical has been replaced by an organic radical, as, for example, an aromatic or an aliphatic radical, with preference given to the cardanyl alkyl ethers.

The term "cardanyl" as used herein described that group of radical which remains on the removal of the —OH radical from cardanol, as

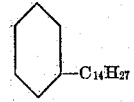

Making use of this term, the following structural formula represents cardanyl ethyl ether,

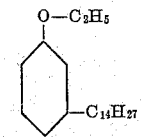

It is to be understood that all cardanol ethers are contemplated herein for reaction with sulfur halides and that all organic radicals may replace the ethyl radical (—$C_2H_5$) shown above. In this regard, the organic radical may be alkyl such as methyl, propyl, butyl, decyl, cetyl, octadecyl, etc.; olefin, that is, alhylene, such as vinyl, propenyl, octadecenyl, etc.; aralkyl such as benzyl, etc.; aryl as typified by phenyl, naphthyl, etc.; alkaryl as represented by methyl phenyl and methyl naphthyl, etc.; cycloalkyl as represented by cyclohexyl; etc. In short oily, halogen- and sulfur-containing reaction products are obtained by reaction, under the conditions described herein, of a sulfur halide and any cardanol ether wherein the hydroxyl-hydrogen of cardanol is replaced by a hydrocarbon group.

While all sulfur halides are contemplated herein for reaction with the foregoing cardanol ethers, the sulfur chlorides—sulfur monochloride and sulfur dichloride—are preferred.

It is believed that sulfur mono- and di-halides react with the carbon atoms of the unsaturated bond of the —$C_{14}H_{27}$ group, thereby forming the halo-sulfurized cardanol ethers. This suggestion for the mechanism of reaction, however, is merely speculation and is not to be interpreted strictly so as to limit in any way the scope of this invention, for the halo-sulfurized cardanol ethers herein described are contemplated broadly as the reaction products of sulfur halides and cardanol ethers.

Typical halo-sulfurized cardanol ethers were prepared as follows:

(a) *Cardanyl ethyl ether-sulfur monochloride reaction product.*—A solution of 21.4 grams of sulfur monochloride dissolved in 20 cc. of benzol was gradually added to a stirred benzol solution of cardanyl ethyl ether containing 100 grams of the ether. The temperature was maintained at approximately 30° C. during this addition, which required about two hours. The temperature was then raised to 70° C. and maintained for a period of three hours. This was followed by water-washing until the washings were neutral. Then the solution was topped under diminished pressure to 150° C. to remove solvent and to obtain the finished product. The reaction product, a brown viscous oil, contains about 8 per cent sulfur and about 6 per cent chlorine.

(b) *Cardanyl ethyl ether-sulfur dichloride reaction product.*—To a stirred benzol solution of cardanyl ethyl ether containing 100 grams of the ether was gradually added 24.5 grams of sulfur dichloride. The temperature was maintained at approximately 30° C. during this addition which required about one and one-half hours. The mixture was then stirred at room temperature for three hours, followed by refluxing at approximately 78° C. for three hours more. This was followed by water-washing until the washings were neutral. Then, the solution was topped under diminished pressure to 175° C. to remove the solvent and to obtain the finished product. The reaction product, a brown viscous oil contains about 6.4% sulfur and about 6.4% chlorine.

The preparation of typical reaction products shown above is but illustrative inasmuch as the reaction temperatures used therein may be varied considerably. For example, temperatures as low as about 20° C., and as high as about 100° C. may be used, preference being given, however, to reaction temperatures of the order of 25° C. to 75° C. It can also be said that it is advisable to maintain the reactants at a relatively low temperature, as about 30° C., during the initial stages of the reaction.

In preparing the reaction products contemplated herein, it is preferred that from about 0.25 mol to about 1.0 mol of a sulfur halide be reacted with one mol of a cardanyl ether, and particularly preferred products are obtained when 0.5 mol of sulfur halide is reacted with one mol of a cardanyl ether.

It will be understood, of course, that suitable diluents other than benzene, shown above in (a), may be present during the reaction. Similarly, it will be apparent that the reaction may be carried out without a diluent.

It is to be further understood that although I have described certain preferred procedures for preparing the reaction products contemplated herein and have shown illustrative reaction products, the invention is not limited to the particular procedures or products, but includes within its scope such changes and modifications as fairly come within the spirit of the appended claims.

I claim:

1. As a new composition of matter, an oily halogen- and sulfur-containing reaction product obtained by reaction of from about 0.25 mol to about 1.0 mol of a cardanol alkyl ether and about 1.0 mol of a sulfur halide at a temperature between about 20° C and about 100° C.

2. As a new composition of matter, an oily chlorine- and sulfur-containing reaction product obtained by reaction of from about 0.25 mol to about 1.0 mol of a cardanol alkyl ether and about 1.0 mol of a sulfur chloride at a temperature between about 20° C. and about 100° C.

3. As a new composition of matter, an oily chlorine- and sulfur-containing reaction product obtained by reaction of from about 0.25 mol to about 1.0 mol of a cardanol alkyl ether and about 1.0 mol of sulfur monochloride at a temperature between about 20° C. and about 100° C.

4. As a new composition of matter, an oily chlorine- and sulfur-containing reaction product obtained by reaction of from about 0.25 mol to about 1.0 mol of a cardanol alkyl ether and about 1.0 mol of sulfur dichloride at a temperature between about 20° C. and about 100° C.

5. As a new composition of matter, an oily chlorine- and sulfur-containing reaction product obtained by reaction of about 1 mol of cardanol ethyl ether and about 0.5 mol of sulfur monochloride at a temperature between about 20° C. and about 75° C.

6. As a new composition of matter, an oily chlorine- and sulfur containing reaction product obtained by reaction of about 1 mol of cardanol ethyl ether and about 1 mol of sulfur dichloride at a temperature between about 20° C. and about 75° C.

FERDINAND P. OTTO.